(12) United States Patent
Cuevas et al.

(10) Patent No.: US 7,416,260 B1
(45) Date of Patent: Aug. 26, 2008

(54) VEHICLE WHEEL COVER RETENTION SYSTEM AND METHOD FOR PRODUCING SAME

(75) Inventors: Mike Cuevas, Rockwood, MI (US); Gary Wehrwein, Washington Township, MI (US); John Hoyle, South Lyon, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 88 days.

(21) Appl. No.: 11/522,582

(22) Filed: Sep. 18, 2006

(51) Int. Cl.
*B60B 7/08* (2006.01)
*B60B 7/04* (2006.01)

(52) U.S. Cl. ............. 301/37.43; 301/37.11; 301/37.106

(58) Field of Classification Search ............ 301/37.101, 301/37.42, 37.43, 37.102, 37.35, 37.11, 37.26, 301/37.27, 37.28, 37.31, 37.32, 37.33, 37.34, 301/37.106

See application file for complete search history.

(56) References Cited

U.S. PATENT DOCUMENTS

| 6,022,081 | A | 2/2000 | Hauler et al. |
| 6,402,254 | B1 | 6/2002 | Eikhoff et al. |
| 6,457,781 | B1 | 10/2002 | Cutcher et al. |
| 6,609,763 | B1 | 8/2003 | Kinstler et al. |
| 6,779,852 | B2 * | 8/2004 | Van Houten et al. ..... 301/37.43 |
| 6,969,124 | B2 | 11/2005 | Gerard |
| 7,204,562 | B2 * | 4/2007 | Gerard ..................... 301/37.43 |
| 7,300,116 | B2 * | 11/2007 | Bruce et al. .............. 301/37.31 |
| 2002/0153763 | A1 * | 10/2002 | Van Houten et al. ..... 301/37.43 |
| 2003/0047987 | A1 * | 3/2003 | Enomoto et al. ........ 301/37.101 |
| 2003/0067212 | A1 * | 4/2003 | Wrase et al. ............. 301/37.43 |
| 2005/0073191 | A1 * | 4/2005 | Gerard ................... 301/37.101 |
| 2006/0125311 | A1 * | 6/2006 | Bruce et al. .............. 301/37.43 |

* cited by examiner

*Primary Examiner*—Jason R Bellinger
*Assistant Examiner*—Kip T Kotter
(74) *Attorney, Agent, or Firm*—MacMillan, Sobanski & Todd, LLC

(57) ABSTRACT

The vehicle wheel cover retention system comprises a wheel formed from a suitable material and including a first hub hole provided therein. The first hub hole has a retention member formed in a generally axially extending portion thereof. The wheel cover is formed from a suitable material and includes a second hub hole provided therein. The second hub hole includes an annular axially extending segmented projection. The segmented projection includes a plurality of first tabs and a plurality of second tabs. The plurality of second tabs include a chamfered outer circumferential surface and a shoulder provided thereon. During assembly, the chamfered outer circumferential surface of the plurality of second tabs deflect radially inwardly as the wheel cover is initially installed and moved toward the retention member and then as the wheel cover is further advanced the second tabs move radially outward to enable the shoulder to engage the retention member to thereby secure the wheel cover to the wheel.

14 Claims, 5 Drawing Sheets

VEHICLE WHEEL COVER RETENTION SYSTEM AND METHOD FOR PRODUCING SAME

BACKGROUND OF THE INVENTION

This invention relates in general to vehicle wheels and in particular to an improved vehicle wheel cover retention system and method for producing the same.

BACKGROUND OF THE INVENTION

This invention relates in general to vehicle wheels and in particular to an improved vehicle wheel cover retention system and method for producing the same.

Full or partial vehicle wheel covers of the removable type are well known and have been used for many years to enhance the styling of conventional, stamped wheel discs. Also, it is known to permanently secure a full or partial wheel cover to a vehicle wheel using an adhesive.

SUMMARY OF THE INVENTION

This invention relates to a vehicle wheel cover retention system for securing a wheel cover and a center cap to a vehicle wheel. The vehicle wheel cover retention system comprises a wheel formed from a suitable material and including a first hub hole provided therein. The first hub hole has a retention member formed in a generally axially extending portion thereof. The wheel cover is formed from a suitable material and includes a second hub hole provided therein. The second hub hole includes an annular axially extending segmented projection. The segmented projection includes a plurality of first tabs and a plurality of second tabs. The plurality of second tabs include a chamfered outer circumferential surface and a shoulder provided thereon. During assembly, the chamfered outer circumferential surface of the plurality of second tabs deflect radially inwardly as the wheel cover is initially installed and moved toward the retention member and then as the wheel cover is further advanced the second tabs move radially outward to enable the shoulder to engage the retention member to thereby secure the wheel cover to the wheel.

Other advantages of this invention will become apparent to those skilled in the art from the following detailed description of the invention, when read in light of the accompanying drawings.

DETAILED DESCRIPTION OF THE INVENTION

Figure 1:
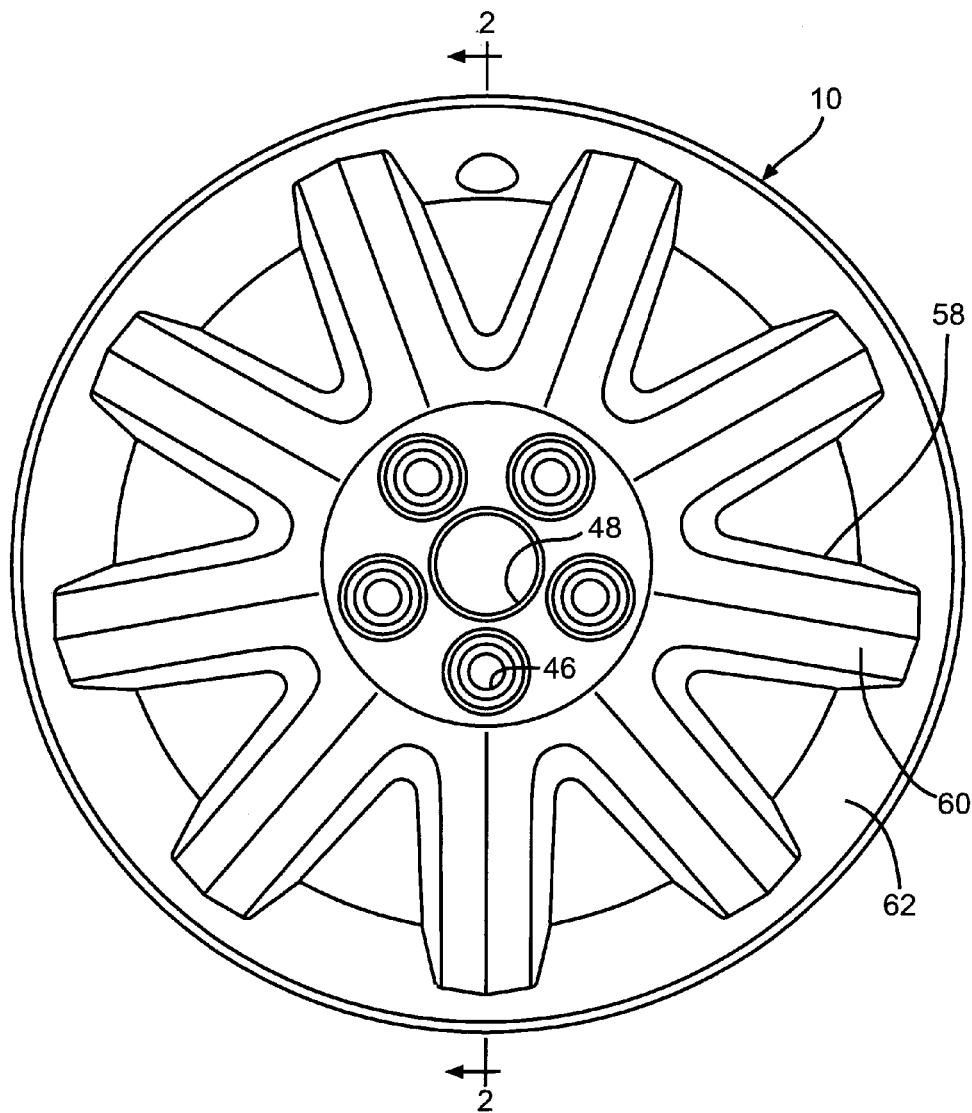
FIG. 1 is a plan view of an embodiment of a vehicle wheel cover retention system, without the center cap being shown.
Figure 2:
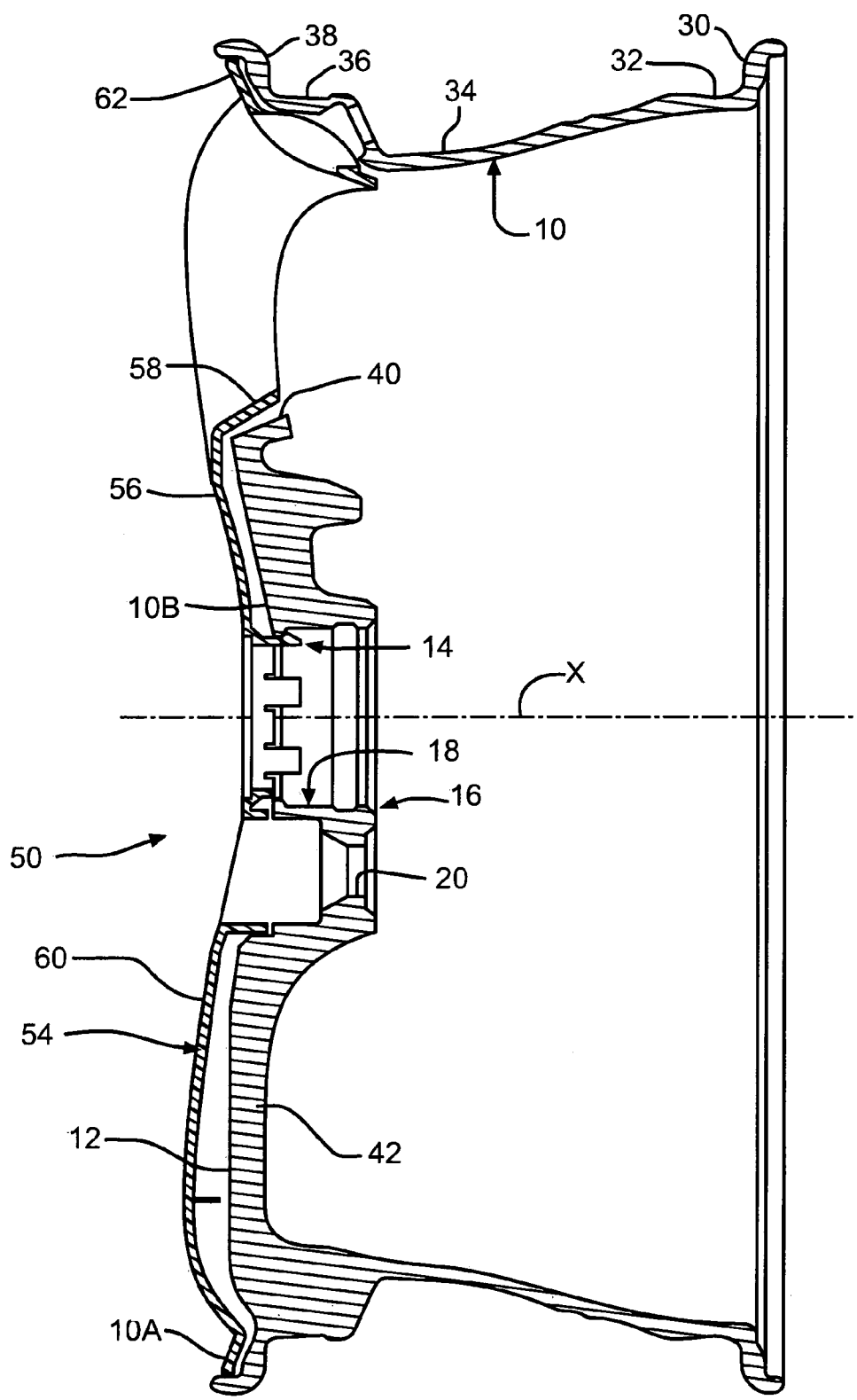
FIG. 2 is a sectional view taken along line 2-2 of FIG. 1.
Figure 3:
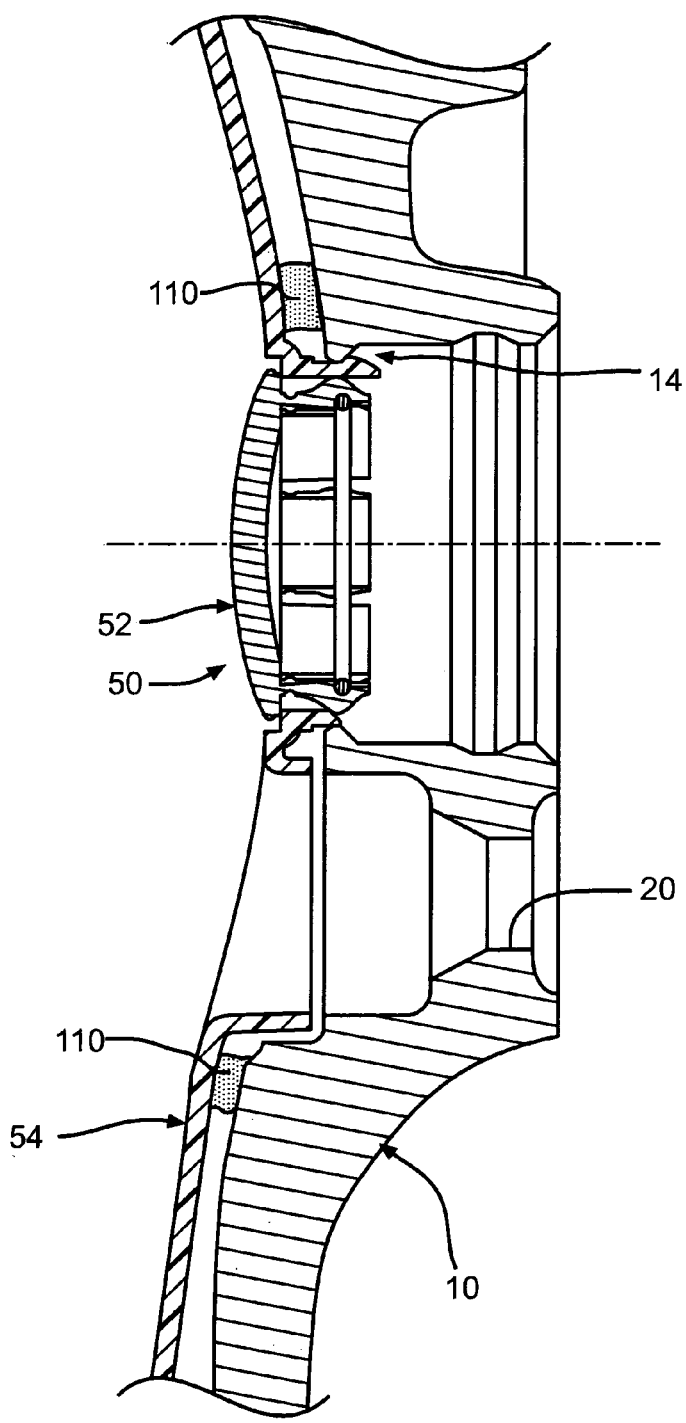
FIG. 3 is an enlarged sectional view of a portion of the vehicle wheel cover retention system, with the center cap being shown.
Figure 3A:
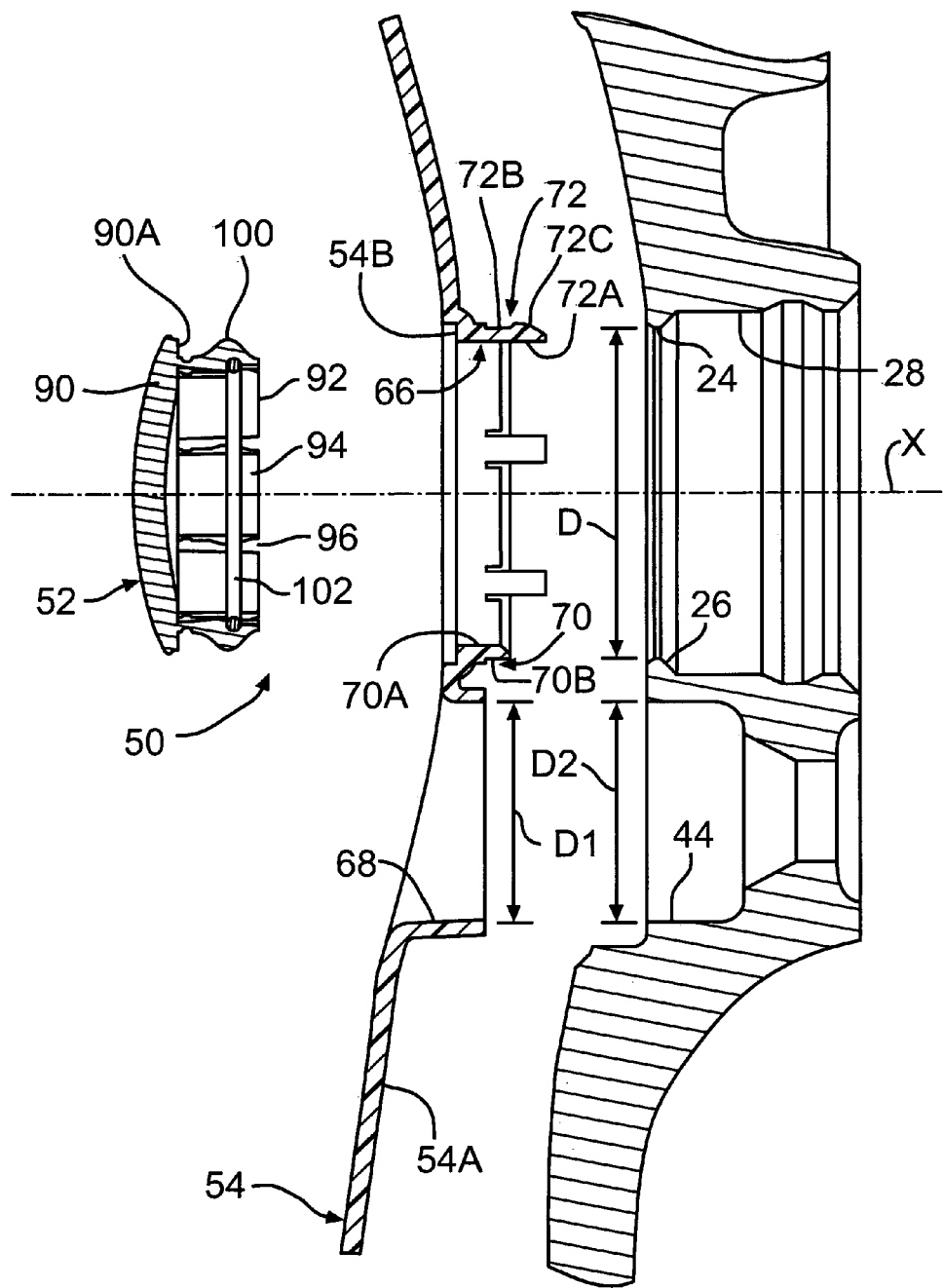
FIG. 3A is an exploded view of the components shown in FIG. 3.
Figure 4:
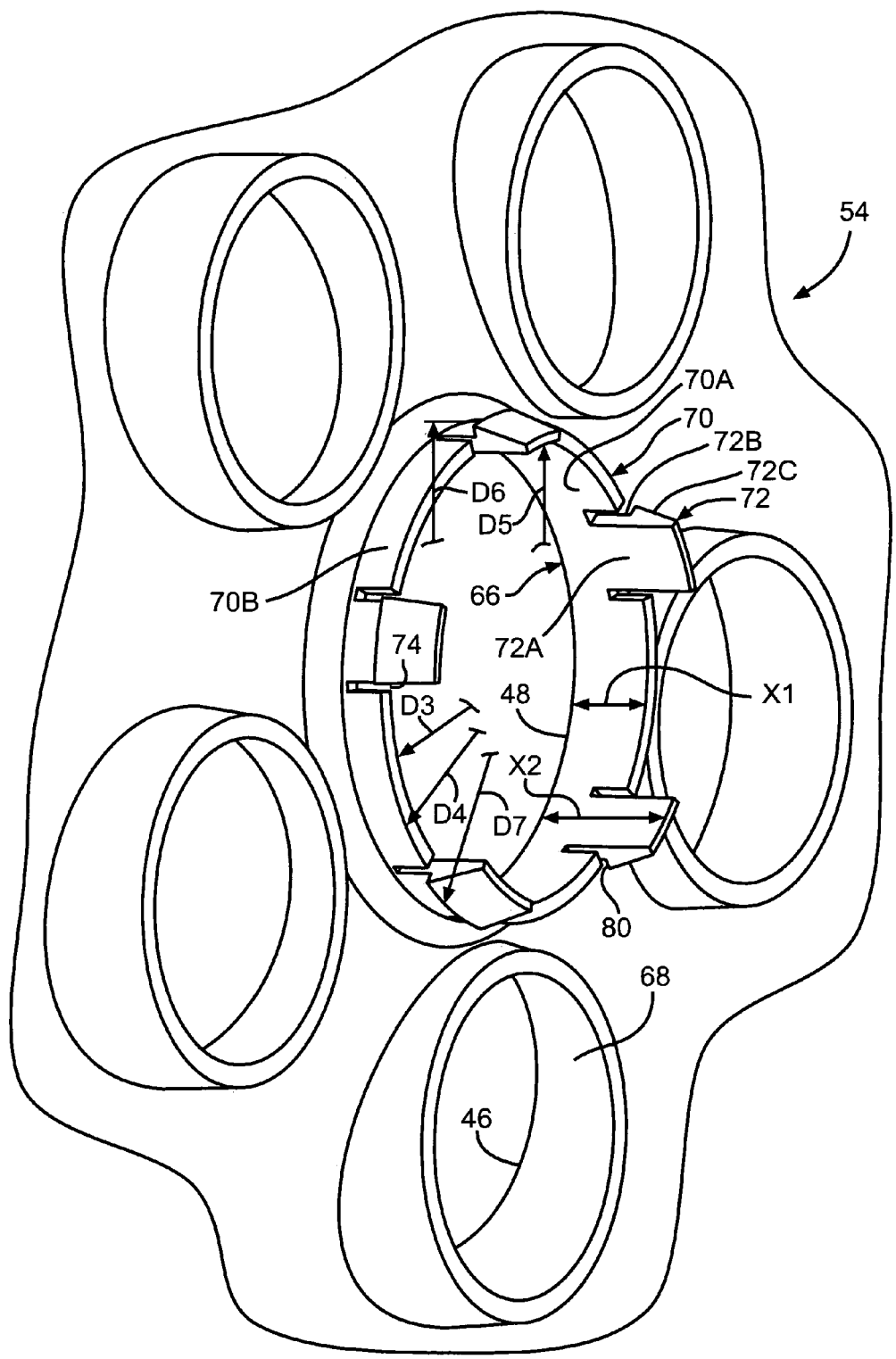
FIG. 4 is a rear plan view of a portion of the vehicle wheel cover shown in FIGS. 1-3.

Referring now to the drawings, there is illustrated in FIGS. 1-3A a vehicle wheel, indicated generally at 10, including an embodiment of a vehicle wheel cover retention system, indicated generally at 50. The vehicle wheel 10 defines a wheel axis X and may be made of any suitable type of material or materials, such as for example, steel, aluminum and alloys thereof, and may be of any suitable type of wheel construction, such as for example, a "full face" type of wheel, such as shown in FIG. 5A of U.S. Pat. No. 5,533,261 to Kemmerer, a "bead seat attached" wheel such as shown in FIG. 4 of U.S. Pat. No. 5,188,429 to Heck et al., a "well attached" wheel such as shown in FIG. 3 of U.S. Pat. No. 5,188,429 to Heck et al., a "bimetal" wheel construction including an aluminum disc and a steel rim such as shown in U.S. Pat. No. 5,421,642 to Wei et al., a "modular wheel" construction such as shown in U.S. Pat. No. 5,360,261 to Archibald et al., a cast aluminum wheel such as shown in U.S. Pat. No. 5,340,418 to Wei, or a euro-flange type of wheel such as shown in U.S. Pat. No. 5,564,792 to Archibald, the disclosures of each of these patents incorporated by reference in entirety herein.

As best shown in FIGS. 2 and 3, in the illustrated embodiment the vehicle wheel 10 is a one-piece full cast aluminum wheel and includes an outboard face 12 and an inner mounting surface 16. The inner mounting surface 16 includes a center hub hole, indicated generally at 18 and a plurality of lug bolt mounting holes 20 spaced circumferentially about the hub hole 18. The hub hole 18 includes a retention member, indicated generally at 14, provided therein.

In the illustrated embodiment, the retention member 14 is formed by selected stepped portions or walls of an axially extending stepped portion or wall 22 of the hub hole 18 of the wheel 10. Preferably, as shown in the illustrated embodiment, the retention member 14 is formed by an reduced diameter outer portion 24 which defines an inner diameter D, an adjacent radially outwardly extending angled or chamfered portion 26, and an adjacent increased diameter intermediate portion 28 of the hub hole 18.

Preferably, the hub hole 18, including the portions 24, 26 and 28 of the retention member 14, are machined in the wheel 10 to predetermined tolerances following the casting of the wheel 10 in order to provide the retention purpose to be described below. The particular shape, profile and/or location of the retention member 14 may be other than illustrated if so desired. Also, the retention member 14 may be formed by other methods if so desired. For example, depending upon the particular construction of the wheel, such as if the wheel is formed from steel, aluminum, magnesium or alloys thereof, the retention member 14 may be formed by other suitable processes for such materials, such as for example by grinding, cutting, machining, rolling and stamping during the forming of the wheel 10 itself (or only the wheel disc portion of the wheel in the case of a fabricated wheel (i.e., a non-cast one-piece wheel), or the retention member 14 may be formed subsequent to the forming process if so desired. The wheel 10 also includes an inboard tire bead seat retaining flange 30, an inboard tire bead seat 32, a generally axially extending well 34, an outboard tire bead seat 36 and an outboard tire bead seat retaining flange 38. Alternatively, the construction of the vehicle wheel 10 may be other than illustrated and described if so desired.

According to the illustrated embodiment of the wheel cover retention system 50, a wheel cover 54 and a center cap 52 are provided. The wheel cover 54 may be formed from a suitable material, such as for example, metal and plastic, and may be chrome-plated, painted or otherwise adorned if so desired. In the illustrated embodiment, the wheel cover 54 is preferably a one-piece wheel cover formed from plastic and has at least an outer surface 56 which is chrome-plated, painted or otherwise adorned or decorated as desired.

Also, in the illustrated embodiment, the wheel cover 54 includes a plurality of vent openings 58 which correspond to a like number of associated vent openings 40 provided in the wheel 10 and a plurality of spokes 60 which correspond to a like number of associated spokes 42 provided in the wheel 10. The wheel cover further includes a plurality of lug bolt holes 46 which generally correspond to the lug bolt openings 20 provided in the wheel 10 and a center hub hole 48 which generally corresponds the hub hole 18 provided in the wheel 10. Alternatively, the wheel cover 54 may be formed from other materials, such as metal and/or may be a multi-piece wheel cover formed of like or unlike materials if so desired.

In the illustrated embodiment, the wheel cover 54 has portions that generally follow the contour of the outboard face 12 of the wheel 10, such as for example, at an outer peripheral portion 62 of the wheel cover 50 adjacent the outboard tire bead seat retaining flange 38 of the wheel 10 and at the vent openings 40 of the wheel 10, and portions which are spaced apart from the outboard face 12 of the wheel 10, for example, at the spokes 42 of the wheel. Thus, it can be understood that the wheel cover 54 may have an inner surface which closely conforms to the outboard face 12 of the wheel 10, may have an inner surface which is spaced from the outboard face 12 of the wheel 10 to impart the styling to the wheel, or may have a combination of both an inner surface which conforms and an inner surface which is spaced apart from the outboard face 12 of the wheel 10.

As best shown in FIG. 4, the center hub hole 48 of the wheel cover 54 includes a centrally located annular axially inwardly extending projection 66 and the lug bolt holes 46 include a plurality of smaller annular axially inwardly extending projections 68 circumferentially spaced about the central projection 66. In the illustrated embodiment, the projections 68 are solid throughout their entire length and define an inner diameter D1 which is approximately equal to (or slightly greater than) an inner diameter D2 of an opening 44 formed in the outboard surface 12 of the wheel 10 adjacent the lug bolt holes 20, to thereby allow access to the lug bolt nuts (not shown). Alternatively, the structure of one or more of the projections 68 of the wheel cover 54 may be other than illustrated and described if so desired.

The central projection 66 is segmented or split for a purpose to be discussed below. To accomplish this in the illustrated embodiment, the central projection 66 includes a plurality of first tabs 70 and a plurality of second tabs 72. In the illustrated embodiment, a respective one of the second tabs 72 is disposed between each pair of the first tabs 70. The first tabs 70 extend a first axial length X1 and the second tabs 72 extend a second axial length X2. In the illustrated embodiment, the second axial length X2 is greater than the first axial length X1. Slits or cuts 74 are provided in the central projection 66 to separate the first tabs 70 and the second tabs 72 from one another. Preferably, as shown in the illustrated embodiment, the slits 74 extend almost the entire first axial length X1 and are generally narrow slits approximately equal to the thickness of the associated material of the central projection 66.

In the illustrated embodiment, the first tabs 70 are identical to one another and define a generally uniform or constant thickness throughout their length X1. As can be appreciated from FIG. 4, the first tabs 70 includes a constant inner circumferential surface 70A which defines a first tab inner diameter D3 and a constant outer circumferential surface 70B which defines a first tab outer diameter D4 of the central projection 66.

In the illustrated embodiment the second tabs 72 are identical to one another. As can be appreciated from FIG. 4, the second tabs 72 include a constant inner circumferential surface 72A which defines a second tab inner diameter D5 and a stepped outer circumferential surface having a constant first outer circumferential surface 72B which defines a second tab first outer diameter D6 and an angled or chamfered second outer circumferential surface 72C which defines a second tab second outer diameter D7 at its radially outwardly most extending portion.

In the illustrated embodiment, the inner diameters D3 and D5 are equal to one another; the outer diameters D4 and D6 are equal to one another and greater than the inner diameters D3 and D5; the outer diameters D4 and D6 are generally equal to the inner diameter D of the portion 24 of the hub hole 18; and the outer diameter D7 is greater than the outer diameters D4 and D6. As a result of this construction, a generally axially extending shoulder 80 is defined in each of the second tabs 72 at the transition from the outer circumferential surface 72B to the chamfered second outer circumferential surface 72C whereby the second tabs 72 are effective to define "snap-in locking tabs" as will be discussed below. Alternatively, the structure of the central projection 66, including the structure of one or more of the tabs 70 and 72, may be other than illustrated and described if so desired.

The center cap 52 includes a first or outer portion 90 and a second or inner portion 92. In the illustrated embodiment, the first portion 90 is generally cup or dome shaped and the second portion 92 is segmented. In particular, the second portion 92 includes a plurality of tabs or projections 94 which are separated from one another by a slit or cut 96. Each of the tabs 94 includes an inner recess 98 and an outer raised tab or projection 100. A split spring 102 is disposed in the inner recesses 98 of the tabs 94. The spring 102 is operative to apply an outward biasing force to the tabs 94. Alternatively, the structure of the center cap 52 may be other than illustrated and described if so desired.

In operation, to install the wheel cover 54 and the center cap 52 onto the wheel 10, the wheel cover 54 is preferably first installed then the center cap 52. To accomplish this, the lug bolt holes 46 of the wheel cover 54 are aligned with the lug bolt holes 20 of the wheel 10 and the wheel cover 54 is moved toward the wheel 10. As the wheel cover 54 is advanced, the chamfered second outer circumferential surface 72C of the tabs 72 of the wheel cover 54 initially engages the reduced diameter inner portion 24 of the hub hole 18 of the wheel 10 and deflect inwardly. Upon further advancement of the wheel cover 54, the surface 72C will move past the portion 24 and the shoulder 80 of the tabs 72 of the wheel cover 54 will engage the surface 26 of the hub hole 18. Thus, it can be seen that the tabs 72 snap-in place against the retention feature 14 of the hub hole 18 of the wheel 10 to secure and position the wheel cover 54 on the wheel 10.

Preferably, in order to permanently secure the wheel cover 54 to the wheel 10, an adhesive or adhesives are used. The adhesive or adhesives may be applied to one or both of the outboard face 12 of the wheel 10 and an inner surface 54A of the wheel cover 54 prior to assembly. Suitable adhesives of this type may include silicone, non-silicone, two-part epoxy, urethane, double-sided tape, expanding foam, and other suitable types of adhesives. Alternatively, in combination with this adhesive or in place thereof, a suitable adhesive may be injected into the space between the outboard face 12 of the wheel 10 and the inner surface 54A of the wheel cover 54 following assembly. Suitable adhesives of this type may include foaming or related expanding types of adhesives. In both instances, the adhesive or adhesives may be selectively applied in a pre-assembly pattern so that following assembly, i.e., post assembly, the adhesive may either fill the entire space between the outboard face 12 of the wheel 10 and the inner surface 54A of the wheel cover 54 or the adhesive may fill less than the entire space therebetween.

In the illustrated embodiment, a suitable type of adhesive, such as a two-part epoxy manufactured by Lord Corporation, is preferably applied to the outboard surface 12 of the wheel 10 in a pre-assembly pattern including a bead of the adhesive around each of the vent openings 40 of the wheel 10, a bead of the adhesive around an outer peripheral surface 10A of the wheel identified generally at 10A, and a bead of adhesive around an inner peripheral surface of the wheel identified generally at 10B. As a result of this, after assembly the adhesive (shown only in FIG. 3 by reference character 110, fills less than the entire space between the outboard face 12 of the wheel 10 and the inner surface 54A of the wheel cover 54. Alternatively, the type and/or the pre-assembly pattern/post-assembly pattern of the adhesive may be other than illustrated if so desired.

Next, the center cap 52 is installed onto the wheel cover 54 and therefore, the wheel 10. To accomplish this, the center cap 52 is aligned with the hub hole 48 of the wheel cover 54 and moved toward the wheel cover 54. As the center cap 52 is advanced, the raised projections 100 of the tabs 94 engage the inner circumferential surfaces 70A and 72A of the tabs 70 and 72, respectively, of the wheel cover reduced diameter inner portion 24 of the hub hole 18 of the projection 68 of the wheel cover 54 and the tabs 94 deflect inwardly. The center cap 52 is further advanced until a surface 90A of the outer portion 90 engages an outer surface 54B of the wheel cover 54. Once installed, the spring 102 applies a sufficient outwardly biasing force against the tabs 92 to thereby releasably secure the center cap 52 to the wheel cover 54. Alternatively, the structure of the center cap 52, including the tabs 94, may be other than illustrated and described if so desired.

One advantage of the present invention is that a single common groove (which is defined by the axially extending stepped portion 22 of the hub hole 18 of the wheel 10), typically already there for the center cap 52, may be used to secure both the wheel cover 54 and the center cap 52 to the wheel. Also, the common groove 22 ensures proper fit appearance of the center cap 52 to the cover 54. Also, if an adhesive is used to permanently secure the wheel cover 54 to the wheel 10, the mechanical retention of the wheel cover 54 to the wheel 10 may be used to position, locate and secure the wheel cover on the wheel while the adhesive cures.

In accordance with the provisions of the patent statutes, the principle and mode of operation of this invention have been described and illustrated in its various embodiments. However, it must be understood that the invention may be practiced otherwise than as specifically explained and illustrated without departing from the scope or spirit of the attached claims.

What is claimed is:

1. A vehicle wheel cover retention system comprising:
   a wheel formed from a suitable material and including a first hub hole provided therein, said first hub hole having a retention member formed in a generally axially extending portion thereof; and
   a wheel cover formed from a suitable material and including a second hub hole provided therein, said second hub hole including an annular axially extending segmented projection, said segmented projection including a plurality of first tabs and a plurality of second tabs;
   wherein said plurality of second tabs include a chamfered outer circumferential surface and a shoulder provided thereon whereby during assembly said chamfered outer circumferential surface of said plurality of second tabs deflect radially inwardly as said wheel cover is initially installed and moved toward said retention member and then as said wheel cover is further advanced said second tabs move radially outward to enable said shoulder to engage said retention member to thereby secure said wheel cover to said wheel;
   wherein said plurality of first tabs extend a first axial length and said plurality of second tabs extend a second axial length which is greater than said first axial length, and wherein a respective one of said second tabs is disposed between each pair of said first tabs, and a slit is provided in said segmented projection to separate said first tabs and said second tabs from one another.

2. The vehicle wheel cover retention system of claim 1 wherein said retention member is formed by a reduced diameter outer portion which defines a first hub hole inner diameter, an adjacent radially outwardly extending chamfered portion, and an increased diameter intermediate portion of said first hub hole.

3. The vehicle wheel cover retention system of claim 1 wherein said slits extend almost the entire length of said first axial length.

4. The vehicle wheel cover retention system of claim 1 wherein said first plurality of tabs include a constant inner circumferential surface which defines a first tab inner diameter and a constant outer circumferential surface which defines a first tab outer diameter.

5. The vehicle wheel cover retention system of claim 1 wherein said second plurality of tabs include a constant inner circumferential surface which defines a second tab inner diameter and a stepped outer circumferential surface having a constant first outer circumferential surface which defines a second tab first outer diameter and a chamfered second outer circumferential surface which defines a second tab second outer diameter at its radially outwardly most extending portion, and a generally radially outwardly extending shoulder at the transition from said second tab constant first outer circumferential surface to said second tab chamfered second outer circumferential surface.

6. The vehicle wheel cover retention system of claim 1 wherein wheel cover is permanently attached to said wheel by at least one type of an adhesive.

7. A vehicle wheel cover retention system comprising:
   a wheel formed from a suitable material and including a first hub hole provided therein, said first hub hole having a retention member formed in a generally axially extending portion thereof; and
   a wheel cover formed from a suitable material and including a second hub hole provided therein, said second hub hole including an annular axially extending segmented projection, said segmented projection including a plurality of first tabs and a plurality of second tabs;
   wherein said plurality of second tabs include a chamfered outer circumferential surface and a shoulder provided thereon whereby during assembly said chamfered outer circumferential surface of said plurality of second tabs deflect radially inwardly as said wheel cover is initially installed and moved toward said retention member and then as said wheel cover is further advanced said second tabs move radially outward to enable said shoulder to engage said retention member to thereby secure said wheel cover to said wheel, wherein said first plurality of tabs include a constant inner circumferential surface which defines a first tab inner diameter and a constant outer circumferential surface which defines a first tab outer diameter, said second plurality of tabs include a constant inner circumferential surface which defines a second tab inner diameter and a stepped outer circumferential surface having a constant first outer circumferential surface which defines a second tab first outer diameter and a chamfered second outer circumferential surface which defines a second tab second outer diameter at its radially outwardly most extending portion, and a generally radially outwardly extending shoulder at the transition from said second tab constant first outer circumferential surface to said second tab chamfered second outer circumferential surface, wherein said first tab inner diameter and said second tab inner diameter are equal to one another, and wherein said first tab outer diameter and said second tab first outer diameter are equal to one another, and said second tab second outer diameter is greater than said first tab outer diameter and said second tab first outer diameter.

8. The vehicle wheel cover retention system of claim 7 wherein said retention member is formed by a reduced diameter outer portion which defines a first hub hole inner diameter, an adjacent radially outwardly extending chamfered portion, and an increased diameter intermediate portion of said first hub hole, and wherein said first hub hole inner diameter is approximately equal to said first tab outer diameter and said second tab first outer diameter.

9. A vehicle wheel cover retention system comprising:
a wheel formed from a suitable material and including a first hub hole provided therein, said first hub hole having a retention member formed in a generally axially extending portion thereof; and
a wheel cover formed from a suitable material and including a second hub hole provided therein, said second hub hole including an annular axially extending segmented projection, said segmented projection including a plurality of first tabs and a plurality of second tabs separated from another by a slit provided in said segmented projection;
wherein said first plurality of tabs include a constant inner circumferential surface which defines a first tab inner diameter and a constant outer circumferential surface which defines a first tab outer diameter, said second plurality of tabs include a constant inner circumferential surface which defines a second tab inner diameter and a stepped outer circumferential surface having a constant first outer circumferential surface which defines a second tab first outer diameter and a chamfered second outer circumferential surface which defines a second tab second outer diameter at its radially outwardly most extending portion, and a generally radially outwardly extending shoulder at the transition from said second tab constant first outer circumferential surface to said second tab chamfered second outer circumferential surface, and wherein during assembly said chamfered second outer circumferential surface of said plurality of second tabs deflect radially inwardly as said wheel cover is initially installed and moved toward said retention member and then as said wheel cover is further advanced said second tabs move radially outward to enable said shoulder to engage said retention member to thereby secure said wheel cover to said wheel.

10. The vehicle wheel cover retention system of claim 9 wherein said retention member is formed by a reduced diameter outer portion which defines a first hub hole inner diameter, an adjacent radially outwardly extending chamfered portion, and an increased diameter intermediate portion of said first hub hole.

11. The vehicle wheel cover retention system of claim 9 wherein said first tab inner diameter and said second tab inner diameter are equal to one another.

12. The vehicle wheel cover retention system of claim 9 wherein said first tab outer diameter and said second tab first outer diameter are equal to one another, and said second tab second outer diameter is greater than said first tab outer diameter and said second tab first outer diameter.

13. The vehicle wheel cover retention system of claim 9 wherein said retention member is formed by a reduced diameter outer portion which defines a first hub hole inner diameter, an adjacent radially outwardly extending chamfered portion, and an increased diameter intermediate portion of said first hub hole, and wherein said first hub hole inner diameter is approximately equal to said first tab outer diameter and said second tab first outer diameter.

14. The vehicle wheel cover retention system of claim 9 wherein said wheel cover is permanently attached to said wheel by at least one type of an adhesive.

* * * * *